United States Patent
Ahamed et al.

(10) Patent No.: US 12,471,251 B2
(45) Date of Patent: Nov. 11, 2025

(54) OPTICAL TRANSCEIVER

(71) Applicant: Fujikura Ltd., Tokyo (JP)

(72) Inventors: Mohammad Shahed Ahamed, Tokyo (JP); Yuji Saito, Tokyo (JP); Akihiro Takamiya, Tokyo (JP); Tsuyoshi Ogawa, Tokyo (JP)

(73) Assignee: Fujikura Ltd., Tokyo (JP)

( * ) Notice: Subject to any disclaimer, the term of this patent is extended or adjusted under 35 U.S.C. 154(b) by 206 days.

(21) Appl. No.: 18/266,095

(22) PCT Filed: Oct. 26, 2021

(86) PCT No.: PCT/JP2021/039431
§ 371 (c)(1),
(2) Date: Jun. 8, 2023

(87) PCT Pub. No.: WO2022/149337
PCT Pub. Date: Jul. 14, 2022

(65) Prior Publication Data
US 2023/0389232 A1    Nov. 30, 2023

(30) Foreign Application Priority Data

Jan. 6, 2021  (JP) ................ 2021-000705

(51) Int. Cl.
*H05K 7/20* (2006.01)
*H04B 10/40* (2013.01)

(52) U.S. Cl.
CPC ......... *H05K 7/20336* (2013.01); *H04B 10/40* (2013.01)

(58) Field of Classification Search
CPC .................................................. H05K 7/20336
See application file for complete search history.

(56) References Cited

U.S. PATENT DOCUMENTS 7,606,036 B2 * 10/2009 Hwang ................ H01L 23/427
165/185
2006/0227515 A1 * 10/2006 Enami .................. H01L 23/427
361/720

(Continued)

FOREIGN PATENT DOCUMENTS

JP    2006245356 A    9/2006
JP    2008118357 A    5/2008

(Continued)

OTHER PUBLICATIONS

English translation of International Search Report issued in corresponding International Application No. PCT/JP2021/039431, dated Jan. 11, 2022 (2 pages).

(Continued)

*Primary Examiner* — Mukundbhai G Patel
(74) *Attorney, Agent, or Firm* — Osha Bergman Watanabe & Burton LLP

(57) ABSTRACT

An optical transceiver includes a case including a heat sink, one or more heat generating bodies disposed in the case, one or more heat conducting portions protruding from an inner wall surface of the case and thermally contacting the one or more heat generating bodies, and a heat pipe that transfers heat from the one or more heat conducting portions to the heat sink.

6 Claims, 4 Drawing Sheets

(56) References Cited

U.S. PATENT DOCUMENTS

| | | | |
|---|---|---|---|
| 2009/0159240 A1* | 6/2009 | Chu | H01L 23/427 |
| | | | 165/80.2 |
| 2013/0064512 A1* | 3/2013 | Ghantiwala | H01S 5/02469 |
| | | | 385/92 |
| 2015/0013936 A1 | 1/2015 | Mack | |
| 2015/0237762 A1* | 8/2015 | Holt | H01L 23/3675 |
| | | | 29/890.032 |
| 2020/0008321 A1 | 1/2020 | Marcoccia et al. | |

FOREIGN PATENT DOCUMENTS

| | | |
|---|---|---|
| JP | 2011119564 A | 6/2011 |
| TW | M605286 U | 12/2020 |

OTHER PUBLICATIONS

Office Action issued in corresponding Taiwanese Patent Application No. 110144038, dated Jul. 12, 2022 (8 pages).

* cited by examiner

OPTICAL TRANSCEIVER

BACKGROUND

Technical Field

The present invention relates to an optical transceiver.

Description of the Related Art

Patent Document 1 discloses an optical transceiver in which a transmitter optical sub-assembly (TOSA) and a sheet-like heat pipe in contact with a housing are used as heat dissipation means. Contact between the heat pipe and the TOSA is maintained by a pressing force of a press-fitting part. Contact between the heat pipe and the housing is maintained by a pressing force of a pressing spring. Thus, these are thermally connected to each other.

Patent Document

Patent Document 1: Japanese Patent Publication No. 2008-118357

By the way, as a transmission speed of an optical transceiver has increased in recent years, an amount of heat generated by not only TOSA but also a heat generating body accommodated in a case such as a receiving circuit or a transmitting circuit has increased, and cooling thereof has become an issue.

SUMMARY

One or more embodiments provide an optical transceiver capable of efficiently cooling a heat generating body accommodated in a case such as a receiving circuit and a transmitting circuit.

According to one or more embodiments, there is provided an optical transceiver including: a case provided with a heat sink; a heat generating body accommodated in the case; a heat conducting portion protruding from an inner wall surface of the case and in thermal contact with the heat generating body; and a heat pipe transferring heat that the heat conducting portion receives from the heat generating body to the heat sink.

According to this configuration, the heat conducting portion protruding from the inner wall surface of the case is in thermal contact with the heat generating body accommodated in the case, so that the heat of the heat generating body is transferred to the heat conducting portion. The heat pipe efficiently transfers the heat that the heat conducting portion receives from the heat generating body to the heat sink, thereby promoting heat dissipation from the heat generating body. Therefore, it is possible to efficiently cool the heat generating body accommodated in the case such as a receiving circuit or a transmitting circuit.

In the above optical transceiver, the heat pipe may be accommodated in a groove formed in the case.

In the above optical transceiver, wherein the heat pipe may be accommodated in the groove formed in an outer wall surface of the case and positioned below a surface of the outer wall surface of the case, and the heat sink may be attached to the surface of the outer wall surface of the case so as to close the groove in which the heat pipe is accommodated.

In the above optical transceiver, a plurality of heat generating bodies including the heat generating body may be provided, a plurality of heat conducting portions including the heat conducting portion may be provided with the plurality of heat generating bodies individually, and the heat pipe may be arranged so as to pass through a plurality of the heat conducting portions.

In the above optical transceiver, the heat pipe may include an accommodation portion accommodated in the groove formed in the inner wall surface of the case, and a protruding portion protruding from the groove formed in the inner wall surface of the case and forming the heat conducting portion.

In the above optical transceiver, the protruding portion may be bent at an obtuse angle with respect to the accommodation portion.

According to one or more embodiments, it is possible to provide an optical transceiver capable of efficiently cooling a heat generating body accommodated in a case such as a receiving circuit and a transmitting circuit.

DESCRIPTION OF THE EMBODIMENTS

Embodiments will be described below with reference to the drawings.

First Example

Figure 1:
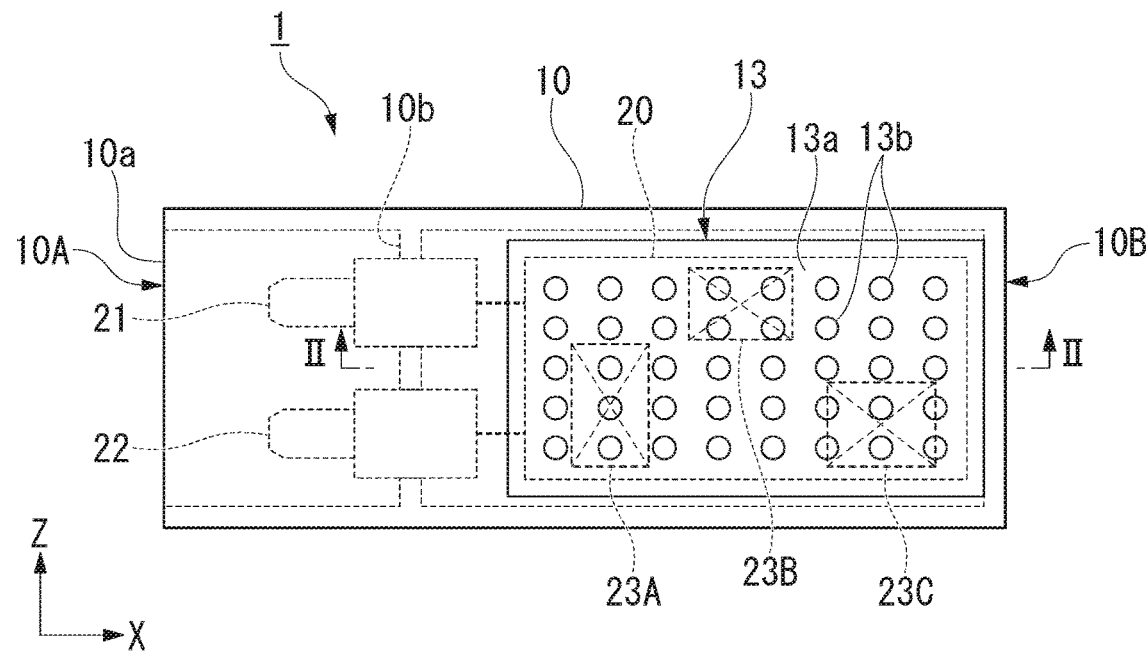
FIG. 1 is a plan view of an optical transceiver according to a first example.

FIG. 1 is a plan view of an optical transceiver 1 according to a first example.

The optical transceiver 1 is a device for mutually converting electrical signals and optical signals. The optical transceiver 1 is used in a data network that connects devices such as data centers, and higher communication speed has been achieved as the bandwidth increases in recent years.

The optical transceiver 1 includes a case 10, and a circuit board 20 and optical modules 21 and 22 accommodated in the case 10. The case 10 is formed in a rectangular box shape in a plan view, and has an optical fiber insertion port 10a formed at a first end portion 10A in a longitudinal direction of the case. An external terminal (not shown) that allows connection between an external device and a circuit board 20 is provided at a second end portion 10B of the case 10 in the longitudinal direction so as to protrude outward from the case 10. A heat sink 13 is provided in the case 10.

<Direction Definition>

In one or more embodiments, an XYZ Cartesian coordinate system is set and a positional relationship of each configuration is described. An X direction is the longitudinal direction in which the case 10 extends. A Y direction is a thickness direction in which the case 10 and the heat sink 13 are stacked. A direction orthogonal to both the X direction and the Y direction is defined as the Z direction. Hereinafter, the X direction is referred to as the longitudinal direction, the Y direction is referred to as the thickness direction, and the Z direction is referred to as a width direction.

The case 10 is provided with a partition wall 10b that partitions an internal space. The optical modules 21 and 22 are held in the partition wall 10b. One of the optical modules 21 and 22 includes a receiving receptacle which is connectable to a receiving-side optical fiber inserted from the insertion port 10a. The other of the optical modules 21 and 22 includes a transmission receptacle which is connectable to a transmission-side optical fiber inserted from the insertion port 10a.

An internal space S is formed in the internal space of the case 10 on a side closer to the second end portion 10B with respect to the partition wall 10b. The circuit board is accommodated in the internal space S.

The circuit board 20 is connected to the optical modules 21 and 22 and includes a plurality of heat generating bodies 23A, 23B and 23C. The heat generating bodies 23A, 23B, and 23C are components mounted on the circuit board 20 and include receiving circuits or transmitting circuits that generate a relatively large amount of heat. Moreover, one of the heat generating bodies 23A, 23B, 23C may include a CPU, a clock data recovery chip (CDR chip), or a transimpedance amplifier chip (TIA chip).

Figure 2:
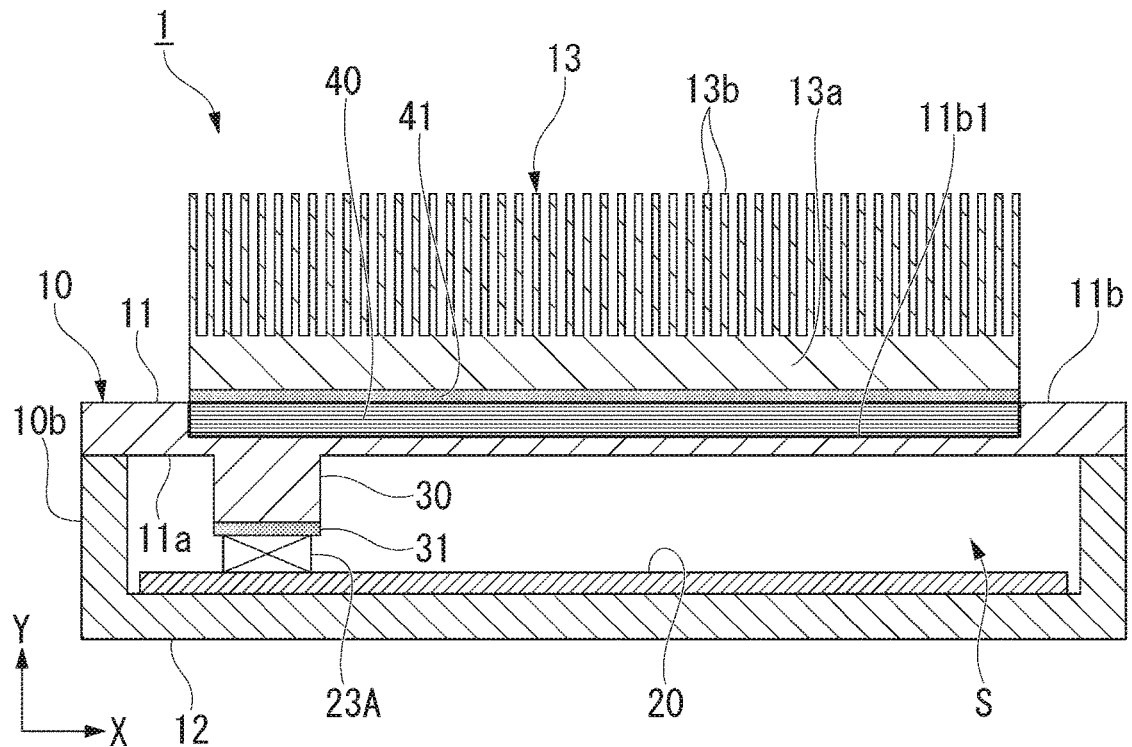
FIG. 2 is a cross-sectional view taken along line II-II shown in FIG. 1.

FIG. 2 is a cross-sectional view taken along line II-II shown in FIG. 1.

The case 10 is configured by combining an upper case 11 and a lower case 12, as shown in FIG. 2. The lower case 12 is formed in a box-like shape with an open top and accommodating the circuit board 20. The upper case 11 is formed as a lid that closes an upper opening of the lower case 12. The upper case 11 has an inner wall surface 11a facing the internal space S and an outer wall surface 11b facing a side opposite to the inner wall surface 11a.

The heat sink 13 is attached to the outer wall surface 11b (upper surface) of the upper case 11. The heat sink 13 is arranged directly above the circuit board 20. The heat sink 13 may be arranged so as to cover the circuit board 20 when viewed from the thickness direction. Further, the heat sink 13 may be arranged so as to overlap the plurality of heat generating bodies 23A, 23B, and 23C when viewed from the thickness direction.

The heat sink 13 includes a flat base plate 13a and a plurality of fins 13b standing on the base plate 13a. The heat sink 13 is preferably made of a material having a high heat dissipation property, and is preferably made of a metal material such as copper, aluminum, or stainless steel.

A heat conducting portion 30 is provided on the inner wall surface 11a (lower surface) of the upper case 11. The heat conducting portion 30 is a protrusion portion provided on the inner wall surface 11a of the upper case 11. The heat conducting portion protrudes from the inner wall surface 11a of the case 10 and is in thermal contact with the upper surface of the heat generating body 23A. The heat conducting portion 30 is in thermal contact with the heat generating body 23A via a Thermal Interface Material (TIM) such as a heat dissipation sheet 31. The heat conducting portion 30 (upper case 11) is preferably made of a material having high heat conductivity, such as a metal material such as copper, aluminum, or stainless steel.

The upper case 11 is provided with a heat pipe 40 that transfers heat received by the heat conducting portion 30 from the heat generating body 23A to the heat sink 13. The heat pipe 40 is a heat transport element that uses latent heat of a working fluid. The heat pipe 40 includes a flat container in which the working fluid is enclosed, and a wick (not shown) provided inside the container. The working fluid is a well-known heat-transporting medium made of a phase-change substance that changes phases between a liquid phase and a gas phase within the container. For example, water (pure water), alcohol, ammonia, or the like can be used as the working fluid.

The heat pipe 40 is accommodated in a groove 11b1 formed in the case 10. The heat pipe 40 of the first example is accommodated in the groove 11b1 formed in the outer wall surface 11b of the case 10 and positioned below the surface of the outer wall surface 11b of the case 10. That is, a depth of the groove 11b1 is equal to or greater than a thickness of the heat pipe 40 so that the heat pipe 40 does not protrude from the outer wall surface 11b. The heat sink 13 is attached to the outer wall surface 11b of the case 10 so as to close the groove 11b1 in which the heat pipe 40 is accommodated.

The heat sink 13 is attached to the outer wall surface 11b of the case 10 via a TIM such as a heat dissipation sheet 41 so as to close the groove 11b1 in which the heat sink 13 is accommodated. That is, part of the heat sink 13 may be accommodated in the groove 11b1.

The heat sink 13 and the heat pipe 40 may be arranged so as to be in thermal contact via a TIM such as the heat dissipation sheet 41.

Figure 3:
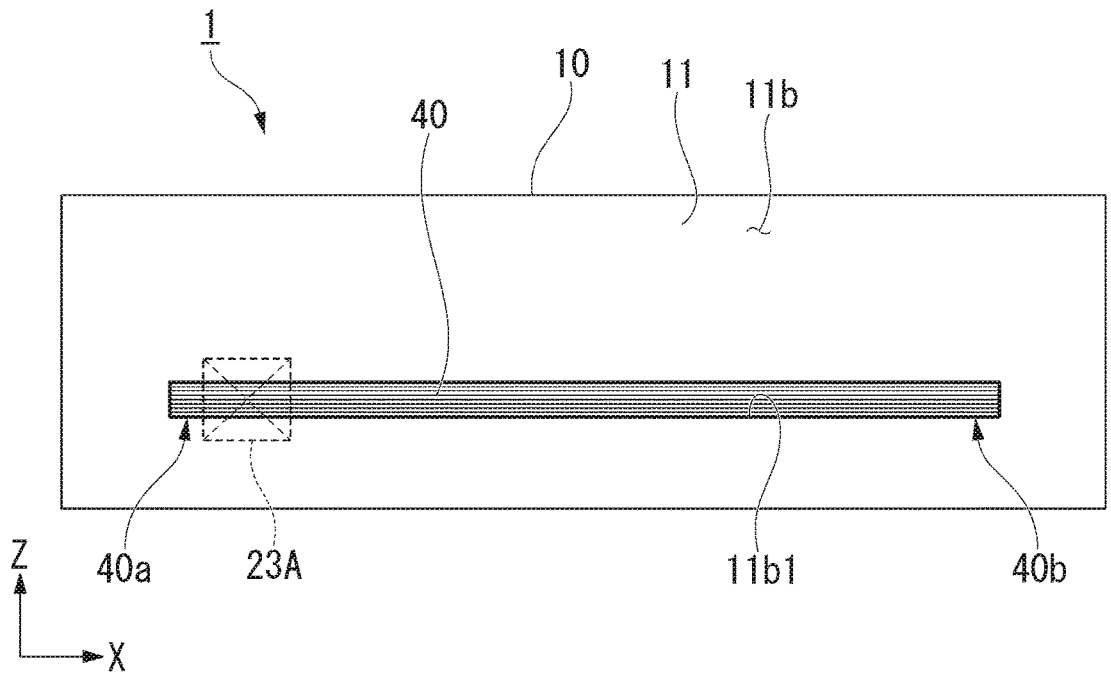
FIG. 3 is a plan view of an upper case showing an arrangement of a heat pipe with respect to a heat generating body according to the first example.

FIG. 3 is a plan view of the upper case 11 showing an arrangement of the heat pipes 40 with respect to the heat generating body 23A according to the first example.

As shown in FIG. 3, the heat pipe 40 extends linearly so as to pass directly above the heat generating body 23A. As shown in FIG. 2, the total length of the heat pipe 40 is equal to or less than the total length of the heat sink 13, extends in the longitudinal direction of the heat sink 13, and is long enough not to protrude from the base plate 13a. A width of the heat pipe 40 may be smaller than the width of the heat generating body 23A. In the example of FIG. 3, the heat generating body 23A is arranged on a side of a first end portion 40a of the heat pipe 40, and a heat generating body is not arranged on a side of a second end portion 40b.

According to the optical transceiver 1 configured as described above, as shown in FIG. 2, the heat conducting portion 30 protruding from the inner wall surface 11a of the case 10 is in thermal contact with the heat generating body 23A accommodated in the case Therefore, the heat of the heat generating body 23A is transferred to the heat conducting portion 30. The heat pipe 40 efficiently transfers the heat received by the heat conducting portion 30 from the heat generating body 23A to the heat sink 13, thereby promoting heat dissipation from the heat generating body 23A. In particular, in the heat pipe 40, the heat of the heat generating body 23A is transported to the second end portion side, and the heat transported along the longitudinal direction is also dissipated by the heat sink 13. That is, in the optical transceiver 1 of one or more embodiments, heat is transported over a wider area by the heat pipe 40 than in a configuration without the heat pipe, so it is possible to efficiently dissipate the heat. Therefore, the heat generating body 23A accommodated in the case 10 such as the receiving circuit and the transmitting circuit can be efficiently cooled.

Figure 4:
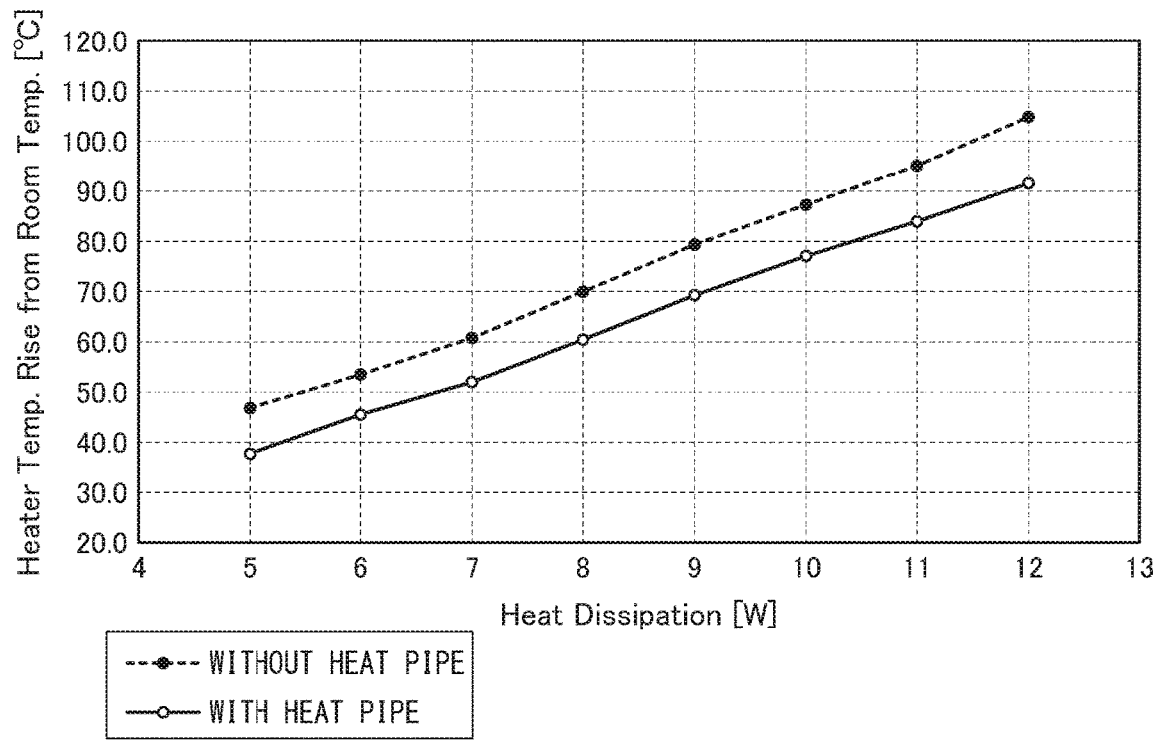
FIG. 4 is a diagram comparing performance of the optical transceiver with the heat pipe according to the first example and the conventional optical transceiver without the heat pipe.

FIG. 4 is a diagram comparing performance of the optical transceiver 1 with the heat pipe 40 according to the first example and the conventional optical transceiver without the heat pipe 40. A horizontal axis of the graph in FIG. 4 is power consumption in the heat generating body 23A, and a vertical axis is a temperature of the heat generating body 23A.

As shown in FIG. 4, the optical transceiver 1 with the heat pipe 40 can effectively lower the temperature of the heat generating body 23A compared to the conventional optical transceiver without the heat pipe 40. For example, when the power consumption of the heat generating body 23A is 12 W, the temperature can be lowered by 13° C. or more.

As described above, according to the first example described above, the optical transceiver 1 includes the case 10 provided with the heat sink 13, the heat generating body 23A accommodated in the case 10, and the heat conducting portion 30 protruding from the inner wall surface 11a of the case 10 and in thermal contact with the heat generating body 23A, and the heat pipe 40 transferring the heat that the heat conducting portion 30 receives from the heat generating body 23A to the heat sink 13. By adopting this configuration, it is possible to provide the optical transceiver 1 capable of efficiently dissipating the heat from the heat generating body 23A accommodated in the case 10 such as the receiving circuit and the transmitting circuit.

Moreover, in the optical transceiver 1 of one or more embodiments, the heat pipe is accommodated in the groove 11b1 formed in the case 10. With this configuration, a contact area between the heat pipe 40 and the case 10 increases, and it is possible to efficiently transfer the heat obtained by the heat conducting portion 30 to the heat pipe 40 via the case 10.

Further, in the optical transceiver 1 of one or more embodiments, the heat pipe 40 is accommodated in the groove 11b1 formed in the outer wall surface 11b of the case 10 and positioned below the surface of the outer wall surface 11b of the case 10, and the heat sink 13 is attached to the surface of the outer wall surface 11b of the case 10 so as to close the groove 11b1 in which the heat pipe 40 is accommodated. According to this configuration, the heat pipe 40 does not protrude from the outer wall surface 11b of the case 10, so that the heat sink 13 is easily brought into close contact with the outer wall surface 11b of the case 10, thereby enhancing heat dissipation property.

Second Example

Next, a second example will be described. In the following description, the same or equivalent configurations as those in the above-described example are designated by the same reference numerals, and descriptions thereof will be simplified or omitted.

Figure 5:
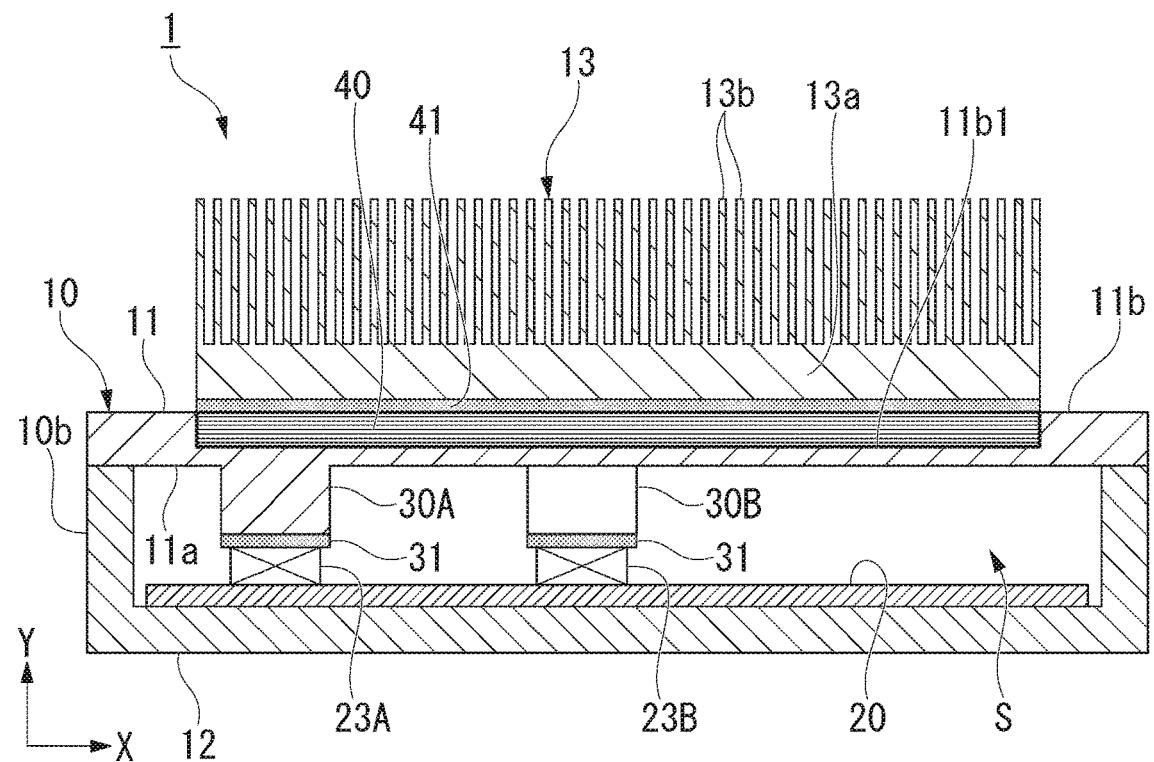
FIG. 5 is a cross-sectional view of an optical transceiver according to a second example.
Figure 6:
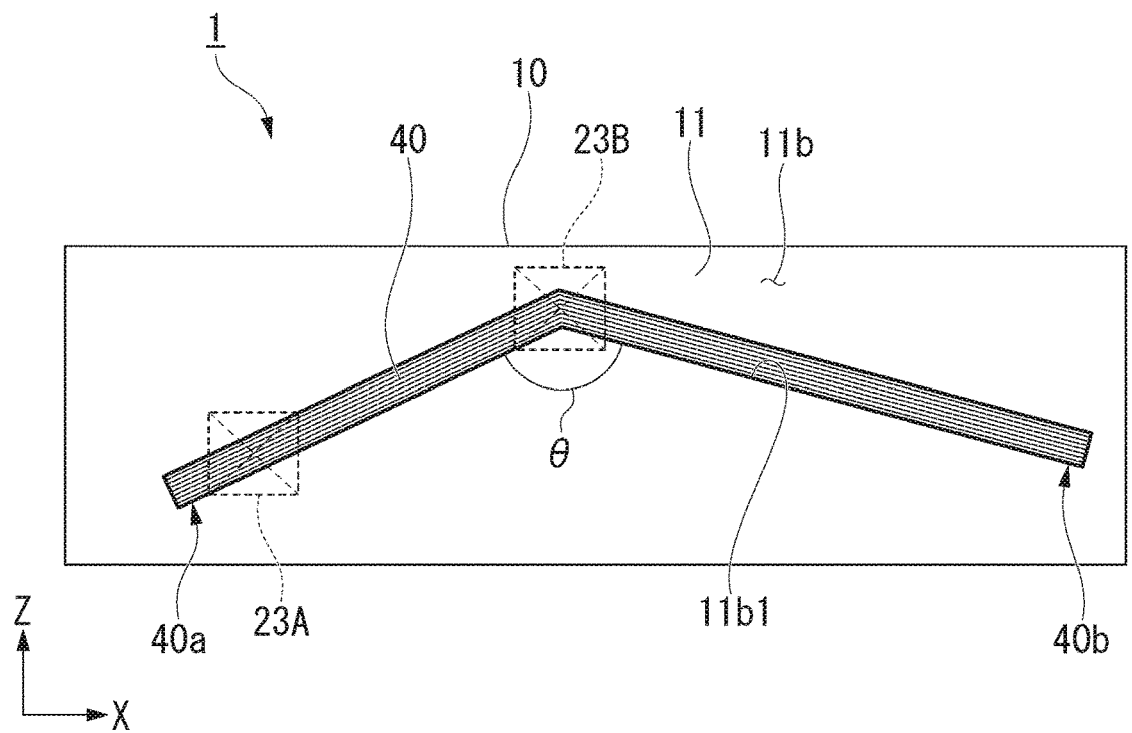
FIG. 6 is a plan view of an upper case showing an arrangement of a heat pipe with respect to a heat generating body according to the second example.

FIG. 5 is a cross-sectional view of the optical transceiver 1 according to the second example. FIG. 6 is a plan view of the upper case 11 showing an arrangement of the heat pipe 40 with respect to the heat generating bodies 23A and 23B according to the second example.

As shown in FIG. 5, the optical transceiver 1 of the second example includes a plurality of heat conducting portions 30A and 30B in thermal contact with a plurality of heat generating bodies 23A and 23B. That is, the inner wall surface 11a of the upper case 11 is formed with a plurality of protrusion portions that are in contact with the heat generating bodies 23A and 23B.

As shown in FIG. 6, the heat pipe 40 is bent at an angle θ in a plan view, and is arranged to pass directly above the heat generating bodies 23A and 23B. That is, the heat pipe 40 passes through the plurality of heat conducting portions 30A and 30B and is capable of receiving heat from the heat conducting portions 30A and 30B. It should be noted that the angle θ is preferably an obtuse angle so as not to crush the internal space of the heat pipe 40. The second end portion 40b on the side opposite to the first end portion of the heat pipe 40 arranged directly above the heat generating body 23A serves as a condensing part of a working fluid. Therefore, the second end portion may not receive heat from the heat generating bodies 23A and 23B.

According to the optical transceiver 1 of the second example configured as described above, the heat conducting portions 30A and 30B are provided with the heat generating bodies 23A and 23B respectively, and the heat pipe 40 is arranged to pass through the plurality of heat conducting portions 30A and 30B. Therefore, the heat of each of the heat generating bodies 23A, 23B is efficiently transferred to the heat sink 13, and it is possible to promote the heat dissipation of the heat generating bodies 23A, 23B. Therefore, the heat generating bodies 23A and 23B (for example, both the receiving circuit and the transmitting circuit) accommodated in the case 10 can be efficiently cooled.

Third Example

Next, a third example will be described. In the following description, the same or equivalent configurations as those in the above-described example are designated by the same reference numerals, and descriptions thereof will be simplified or omitted.

Figure 7:
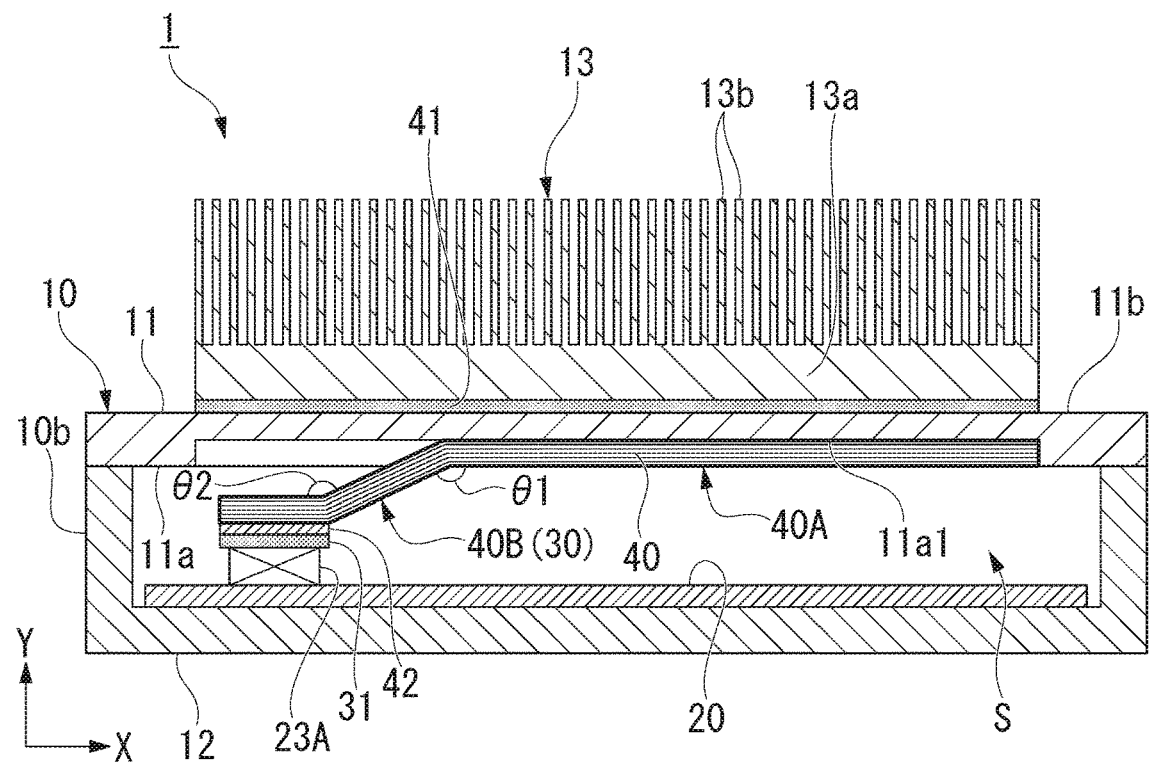
FIG. 7 is a cross-sectional view of an optical transceiver according to a third example.
Figure 8:
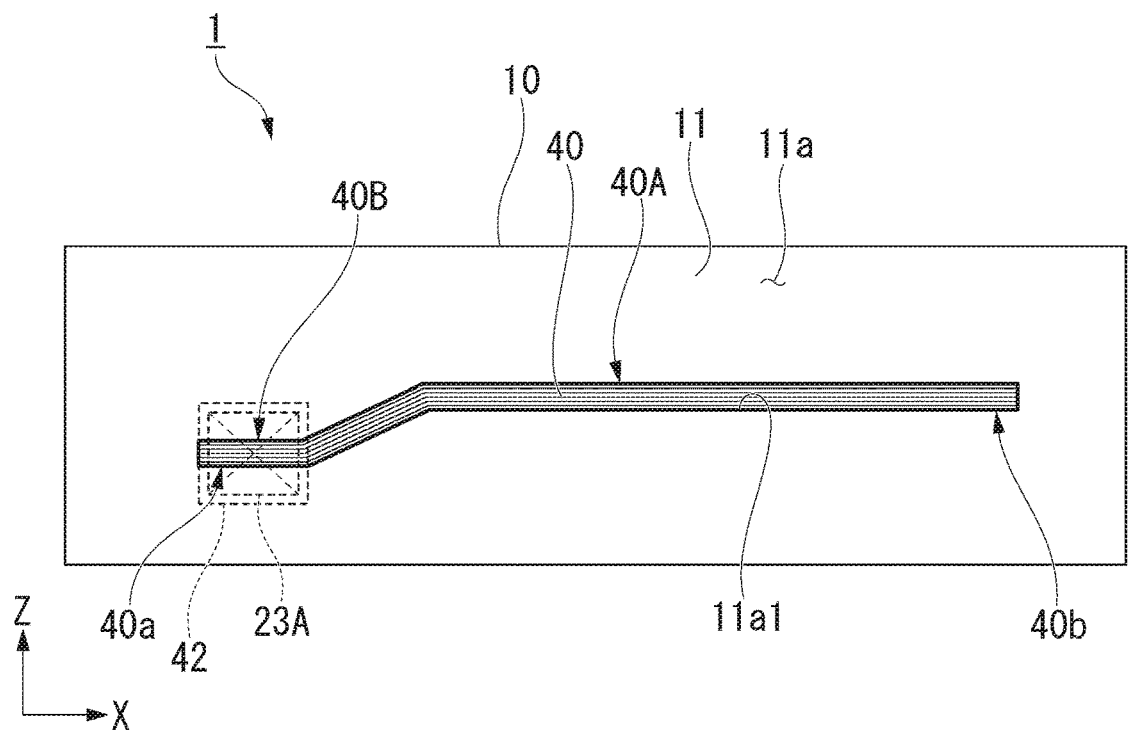
FIG. 8 is a bottom view of an upper case showing an arrangement of a heat pipe with respect to a heat generating body according to the third example.

FIG. 7 is a cross-sectional view of the optical transceiver 1 according to the third example. FIG. 8 is a bottom view of the upper case 11 showing an arrangement of the heat pipes 40 with respect to the heat generating body 23A according to the third example.

As shown in FIG. 7, in the optical transceiver 1 of the third example, the heat pipe is accommodated in the groove 11a1 formed in the inner wall surface 11a of the case 10.

The heat pipe 40 includes an accommodation portion 40A accommodated in the groove 11a1 formed in the inner wall surface 11a of the case 10, and a protruding portion protruding from the groove 11a1 formed in the inner wall surface 11a of the case 10 to form the heat conducting portion 30. The protruding portion 40B is bent at an obtuse angle θ1 with respect to the accommodation portion 40A. Further, a distal end portion of the protruding portion 40B is bent at an obtuse angle θ2 and joined to a metal plate 42. The metal plate 42 is in thermal contact with the upper surface of the heat generating body 23A via the TIM such as the heat dissipation sheet 31.

According to the optical transceiver 1 of the third example configured as described above, the heat pipe 40 includes the accommodation portion 40A accommodated in the groove 11a1 formed in the inner wall surface 11a of the case 10 and the protruding portion protruding from the groove 11a1 formed in the inner wall surface 11a of the case 10 to form the heat conducting portion 30. Therefore, the heat pipe 40 is capable of directly receiving heat from the heat generating body 23A. Accordingly, heat is efficiently transferred to the heat sink 13, and it is possible to promote heat dissipation from the heat generating body 23A.

Further, in the optical transceiver 1 of the third example, the protruding portion is bent at the obtuse angle θ1 with respect to the accommodation portion 40A, so that it is possible to form the protruding portion 40B so as not to crush the internal space of the heat pipe 40. The reason why the distal end portion of the protruding portion 40B is also bent at the obtuse angle θ2 is the same.

A technical scope of the present invention is not limited to the above-described embodiments, and various modifications can be made without departing from a spirit of the present invention.

For example, as shown in FIG. 8, the heat pipe 40 may extend in the longitudinal direction while being bent in plan view. A bending angle at this time may be an obtuse angle. Moreover, the second end portion 40b side of the heat pipe 40 may be arranged so as to extend through a central portion of the heat sink 13 in the width direction.

In addition, in the first and third examples, the example in which one heat conducting portion 30 is formed in the case 10 has been described, but the present invention is not limited to this example. For example, in order to efficiently cool a plurality of heat generating bodies, a plurality of heat conducting portions 30 and a plurality of heat pipes may be arranged according to the number of heat generating bodies.

Part or all of the optical transceiver 1 according to the third example described above can be added as follows.

APPENDIX

An optical transceiver including:
a case provided with a heat sink;
a heat generating body accommodated in the case and including at least one of a receiving circuit and a transmitting circuit;
a heat pipe, a part of which protrudes from an inner wall surface of the case, is in thermal contact with the heat generating body, and transfers heat received from the heat generating body to the heat sink.

In addition, it is possible to appropriately replace the components in the above-described embodiments with well-known components without departing from the scope of the present invention, and the above-described embodiments and modifications may be combined as appropriate. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical transceiver
10: Case
11a: Inner wall surface
11a1: Groove
11b: Outer wall surface
11b1: Groove
13: Heat sink
23A: Heat generating body
30: Heat conducting portion
40: Heat pipe
40A: Accommodation portion
40B: Protruding portion
θ1: Obtuse angle

What is claimed is:

1. An optical transceiver comprising:
a case including:
   a lower case having a box-like shape and an upper opening;
   an upper case that closes the upper opening; and
   a heat sink disposed on an upper surface of the upper case;
one or more heat generating bodies disposed in the lower case;
one or more heat conducting portions protruding from an inner wall surface of the upper case and thermally contacting the one or more heat generating bodies; and
a heat pipe, disposed in a groove in the inner wall surface of the upper case, that transfers heat from the one or more heat conducting portions to the heat sink, wherein the heat pipe includes:
   an accommodation portion disposed in the groove; and
   a protruding portion protruding from the groove and including the one or more heat conducting portions, and
the protruding portion is disposed in an internal space enclosed by the lower case and the upper case.

2. The optical transceiver according to claim 1, wherein the protruding portion is bent at an obtuse angle with respect to the accommodation portion.

3. The optical transceiver according to claim 1, wherein the protruding portion does not contact the case in the internal space.

4. The optical transceiver according to claim 1, further comprising:
a circuit board accommodated in the internal space;
a partition wall dividing the internal space; and
an optical module held in the partition wall and including a receiving receptacle that connects to an optical fiber.

5. The optical transceiver according to claim 4, wherein the circuit board is connected to the optical module and includes the one or more heat generating bodies.

6. The optical transceiver according to claim 1, wherein the heat sink includes a flat base plate and fins standing on the flat base plate, and
each of the fins has a circular shape in a plan view.

* * * * *